United States Patent [19]

Chopin et al.

[11] Patent Number: 5,278,123

[45] Date of Patent: Jan. 11, 1994

[54] MONOLITHIC CATALYSTS FOR CONVERTING SULFUR COMPOUNDS INTO SO2

[75] Inventors: Thierry Chopin, Saint Denis; Jean-Luc Hebrard, Paris; Eric Quemere, Cormeilles en Parisis, all of France

[73] Assignee: Rhone-Poulenc Chimie, Courbevoie, France

[21] Appl. No.: 656,750

[22] Filed: Feb. 19, 1991

[30] Foreign Application Priority Data

Feb. 19, 1990 [FR] France .................. 90 01960

[51] Int. Cl.$^5$ .............. B01J 21/06; B01J 23/40; B01J 23/86; B01J 35/04
[52] U.S. Cl. .................. 502/200; 502/217; 502/325; 502/326; 502/339; 502/527
[58] Field of Search .......... 502/326, 350, 527, 200, 502/217, 325, 339; 423/230

[56] References Cited

U.S. PATENT DOCUMENTS

| | | | |
|---|---|---|---|
| 3,894,965 | 7/1975 | Foster et al. | 502/527 X |
| 4,012,485 | 3/1977 | Meguerian et al. | 502/326 X |
| 4,092,404 | 5/1978 | Hass | 423/539 |
| 4,382,912 | 5/1983 | Madgavkar et al. | 423/224 |
| 4,492,769 | 1/1985 | Blanchard et al. | 502/326 X |
| 4,532,228 | 7/1985 | Golino et al. | 502/527 X |
| 4,857,296 | 8/1989 | Brunelle et al. | 423/230 X |

FOREIGN PATENT DOCUMENTS

| | | |
|---|---|---|
| 0039266 | 11/1981 | European Pat. Off. |
| 0244301 | 11/1987 | European Pat. Off. |
| 0272979 | 6/1988 | European Pat. Off. |
| 52-61192 | 5/1977 | Japan ............... 502/527 |
| 8302605 | 8/1983 | PCT Int'l Appl. |
| 2208482 | 4/1989 | United Kingdom. |

Primary Examiner—W. J. Shine
Attorney, Agent, or Firm—Burns, Doane, Swecker & Mathis

[57] ABSTRACT

Monolithic catalyst shaped articles adopted for the catalytic oxidation conversion of compounds of sulfur, e.g., HS, into sulfur dioxide, include a monolithic substrate containing a catalytically effective amount of at least one catalytically active element for oxidatively converting such compounds of sulfur into $SO_2$.

15 Claims, No Drawings

MONOLITHIC CATALYSTS FOR CONVERTING SULFUR COMPOUNDS INTO SO2

BACKGROUND OF THE INVENTION

1. Field of the Invention

The present invention relates to novel catalysts for the treatment of gases, particularly industrial gaseous effluents containing contaminating amounts of sulfur compounds, to catalytically transform the latter into sulfur dioxide.

This invention especially relates to novel monolithic catalysts for the oxidation of hydrogen sulfide into sulfur dioxide.

2. Description of the Prior Art

Certain industrial effluents, and in particular those emanating from Claus process units and which are also referred to as "tail gases", are known to contain oxidizable polluting compounds of sulfur and sometimes sulfur itself. These must be transformed by oxidation into compounds which can be easily eliminated from such gaseous flowstreams.

The sulfur compounds more particularly present in such effluents are hydrogen sulfide and organic compounds of sulfur, such as carbon disulfide, carbonyl sulfide and/or mercaptans. These effluents can be treated in order to transform the compounds of sulfur into sulfur dioxide ($SO_2$) and carbon dioxide.

Several processes for oxidizing such sulfur compounds are known to this art. The simplest of these known processes entails burning the effluents at high temperatures.

Alternatively, catalytic processes have also been proposed to this art for oxidizing the sulfur compounds into sulfur dioxide.

Among the proposed catalysts, those based on titanium dioxide would appear to present very good performance characteristics. Compare, e.g., European Patent 39,266, which describes a catalyst including, on the one hand, titanium dioxide, or silica, or zirconium dioxide, or mixtures thereof, or silica-magnesia, or zeolites and, on the other, catalytically active elements selected from among those of Groups Ib, IIb, IIIb, Vb, VIb, VIIb, VIII and Va of the Periodic Table and, in particular, copper, silver, zinc cadmium, yttrium, lanthanides, chromium, molybdenum, tungsten, manganese, iron, cobalt, rhodium, iridium, nickel, palladium, platinum, tin and bismuth.

It is also known to use other oxidation catalysts. Thus, U.S. Pat. No. 4,092,404 describes a vanadium-based oxidation catalyst deposited onto a support such as alumina, silica-alumina, silica-magnesia, zirconium dioxide, zirconium dioxide-silica, titanium dioxide, titanium dioxide-silica, silica-zirconium dioxide-titanium dioxide or mixtures thereof.

European Patent 115,449 describes a hydrogen sulfide oxidation catalyst comprising an alumina support, a catalytically active phase selected from among the oxides of at least one of the following metals: Fe, Cu, Ag, W, Co, Ni Cr, Cd and at least one compound selected from among the rare earth oxides, alkaline earth oxides, zirconium dioxide and silica.

The various aforementioned catalysts are generally used in bed form, constituted by a plurality of particles in a column, such bed being traversed by the flow of the gas to be treated.

Hitherto, the catalyst beds have been constituted by catalyst particles in the form of cylindrical or spherical granules formed by molding or extrusion. However, such catalysts do not have a high initial activity with a short contact time, such that it is necessary to conduct the operation employing contact times equal to or greater than approximately 3 seconds. Thus, sulfur trioxide ($SO_3$) is formed on exiting the catalytic bed.

SUMMARY OF THE INVENTION

Accordingly, a major object of the present invention is the provision of an improved monolithic catalyst for the oxidation of hydrogen sulfide into sulfur dioxide ($SO_2$) which avoids or conspicuously ameliorates those disadvantages and drawbacks to date characterizing the state of this art.

Thus, it has now unexpectedly been found that a monolithic catalyst permits a better selectivity of the catalyst with respect to the oxidation of hydrogen sulfide into $SO_2$ as compared with the oxidation reaction into $SO_3$.

Briefly, the present invention features a catalyst for the treatment of gases containing contaminating amounts of objectionable sulfur compounds and, in particular, hydrogen sulfide, for oxidizing said sulfur compounds into sulfur dioxide and comprising, as the essential component thereof, an element for catalyzing the oxidation of such sulfur compounds, and said catalyst necessarily being in monolithic form.

DETAILED DESCRIPTION OF THE PREFERRED EMBODIMENTS OF THE INVENTION

More particularly according to the present invention, by the expression "monolithic form" is intended a catalyst having an alveolar or honeycomb structure including a certain number of hexagons, squares, triangles or other polygons or circles, or in the form of a sine wave, spider's web or spiral. Such an alveolar catalyst has voids or pores defining a total pore volume of from approximately 50% to approximately 70%.

Typically, the catalyst is cylindrical or parallel-epipedic having, over its entire length, orifices completely extending therethrough parallel to its generatrix, thereby permitting the passage of the gases into the channels or ducts thereof.

In a first embodiment of the invention, a so-called mass catalyst is provided, i.e., the catalytically active phase is extruded in monolithic form.

In another embodiment of the invention, a supported catalyst is provided, i.e., the catalytically active phase is deposited onto a monolithic support, which is, therefore, a rigid substrate having an alveolar structure.

The catalyst according to the invention comprises, as the essential component thereof, a catalytically active element selected from among aluminum oxide, titanium dioxide, cerium oxide, zirconium dioxide, iron oxide, zinc oxide, chromium oxide, molybdenum oxide, cobalt oxide, nickel oxide, vanadium oxide or a mixture thereof.

In a preferred embodiment of the catalyst according to the invention, at least one precious metal or metal of Group VIII of the Periodic Table is used. Exemplary thereof are palladium, platinum, rhodium and iridium.

The "oxides" of the catalytically active elements described above comprehend all of the oxides of said elements, whatever their process of preparation or whatever their origin.

The weight proportion of the catalytically active element or elements, expressed in terms of their oxides, relative to the total weight of the final product catalyst, advantageously ranges from 0.5% to 100% and preferably from about 60% to about 99%. The weight proportion of the one or more precious metals can constitute from about 0.05% to about 1% of the weight of the final catalyst.

The catalyst according to the invention can also comprise additives for facilitating shaping and additives for improving the final mechanical properties.

In the preparation of the catalyst according to the invention, additives can be used that are conventionally employed in shaping procedures. These additives impart to the paste obtained by mixing or kneading the rheological properties appropriate for shaping. Exemplary such shaping additives including cellulose, carboxymethyl cellulose, carboxyethyl cellulose, tall oil, xanthan gums, surfactants, flocculants, polyacrylamides, carbon black, starches, stearic acid, polyacrylic alcohol, polyvinyl alcohol, biopolymers, glucose, polyethylene glycols, etc.

Finally, the amount of such additives can range from 0.1% to 15% by weight based on the finished catalyst.

Moreover, it is possible to use complementary constituents adopted to improve the mechanical characteristics of the formulation. These constituents include the clays, silicates, alkaline earth sulfates, ceramic fibers, asbestos or silica.

Advantageously, the catalyst comprises an alkaline earth metal sulfate, preferably calcium, or an ammonium sulfate.

These constituents can be incorporated in amounts by weight based on the finished catalyst of up to 99.5%, preferably up to 60% and more preferably up to 30%.

Such "mass catalyst" according to the invention can be prepared by any appropriate known technique to provide a mass monolith. The latter can be produced by shaping a mixture containing the constituents of the catalyst.

Kneading is carried out using a mixture based on water, powder containing at least one catalytically active element and the optional additives of the above type. The mixture obtained in this manner is then monolithically shaped according to conventional production processes by extrusion, rolling, solidification of the elements in sheet form, and the like.

The thus obtained monolith can be subjected to a drying operation at a temperature ranging from, e.g., 100° to 150° C. for a period of time ranging from 10 to 20 hours.

It can optionally then be calcined at a temperature ranging from approximately 350° C. to approximately 500° C., for a period of time typically ranging from 1 to 8 hours.

The monolithic mass catalysts of this invention typically have a specific surface area ranging from 5 to 300 m$^2$/g and preferably from 50 to 120 m$^2$/g. The specific surface area is a B.E.T. specific surface, i.e., determined by the adsorption of nitrogen in accordance with ASTM Standard D 3663-78 and based on the method of BRUNAUER-EMMETT-TELLER, *Journal of the American Chemical Society*, 60, 309 (1938).

In another embodiment of the invention, the catalytically active element is deposited onto a monolithic support. The latter can be a support with non-basic properties, such as alumina, silica, cerium oxide, zirconium dioxide, titanium dioxide, etc.

Such catalyst can be shaped in the manner described hereinbefore from an oxide or hydrated oxide powder and optionally shaping additives and supplementary constituents improving the mechanical properties in the manner described above.

The known monolithic supports, such as refractory monolithic supports, e.g., metal monoliths or ceramic material monoliths, are also suitable.

Suitable metal monoliths are in particular those produced from alloys of chromium, aluminum and cobalt, such as those marketed under the trademark KANTHAL, or those produced from alloys of iron, chromium, aluminum and yttrium and marketed under the trademark FECRALLOY. The metal can also be carbon steel or cast iron.

Especially suitable ceramic material monoliths are those comprising, as the principal constituent thereof, cordierite, alumina, mullite, zirconium, zirconium mullite, barium titanate, porcelain, thorium oxide, magnesium oxide, steatite, boron or silicon carbides.

The aforementioned monolithic supports are coated with a film or layer of porous material, which is advantageously refractory. This porous material is preferably a macroporous material.

Suitable such porous materials include, e.g., refractory oxides selected from among the oxides of aluminum, magnesium, calcium, strontium, barium, scandium, yttrium, lanthanides, gallium, silicon, titanium, zirconium, hafnium, thorium, niobium, tantalum, chromium, molybdenum and tungsten.

The porous coating and processes for the deposition thereof are known to this art and are not critical according to the invention.

The various monolithic supports can then be impregnated in such manner as to effect the deposition of the catalytically active elements. Impregnation is carried out in known manner by contacting the support with a solution, a sol or a gel having at least one catalytically active element in the form of an oxide or oxide precursor thereof.

The operation is generally carried out by immersing the support having a monolithic structure in a predetermined volume of solution of at least one precursor of a catalytically active element. By "precursor" is intended a solution of a salt or compound of the element, or at least one of the elements constituting the catalytic phase, said salts and compounds being thermally decomposable.

The salt concentration of the solution is selected as a function of the amount of active phase to be deposited onto the monolithic support.

The impregnation surface of the active phase is determined by the adsorbed solution volume. Thus, in one embodiment of the invention, the volume of adsorbed catalytic phase is equal to the total pore volume of the monolithic support to be impregnated. The pore volume can be determined by the known mercury porosimeter method, or it is possible to measure the amount of water adsorbed by a sample. It is also possible to impregnate the support by immersing it, in a solution of catalytically active element precursors and eliminating the excess solution by draining.

The monolithic support can then be subjected to a drying operation and, optionally, calcining, under the conditions described above. It is also possible to repeat these operations with the same support, after drying and calcining it, and to successively deposit several elements on the support and on the given surfaces, which can vary.

Therefore, the monolithic support is coated or impregnated with a layer of a catalytically active phase, the thickness of which can vary from 2 to 500 μm and which constitutes 0.5% to 95% of the weight of the monolithic support and provides a specific surface area generally ranging from 50 to 120 m$^2$/g.

According to the invention, the process of oxidizing hydrogen sulfide and sulfur compounds comprises contacting the gaseous effluent with an oxygen-containing gas in the presence of the monolithic catalyst.

According to the process of the invention, gaseous effluents obtained from different sources can be used. In particular, such gaseous effluents can be constituted by a natural gas, a gas resulting from the gasification of coal or heavy oils, or a gas produced by the hydrogenation of the sulfur compounds of a sulfur plant effluent. The gaseous effluent containing the sulfur compounds has a composition which can vary both with regard to the nature of its constituents and with regards to proportions thereof. Thus, it contains hydrogen sulfide, but optionally also other organic compounds of sulfur, such as carbon disulfide ($CS_2$) and/or carbonyl sulfide (COS) and/or mercaptans.

The gaseous effluent to be treated may have a composition varying over wide limits. Generally, the effluent contains less than 0.5% by volume of hydrogen sulfide, preferably from 0.02% to 0.5% and even more preferably from 0.05% to 0.2% by volume thereof. It can also comprise $CS_2$ and/or COS, whose total concentration is at most 0.2% and preferably at most 0.1% by volume.

The gas used for the oxidation of the hydrogen sulfide is typically air, but oxygen-enriched air, pure oxygen, or mixtures in varying proportions of oxygen and an inert gas, e.g. nitrogen, can also be used.

The amount of gas is such that the oxygen amount is at least equal and preferably exceeds the stoichiometric amount necessary for completely oxidizing the sulfur compounds into sulfur dioxide. Advantageously, the amount of oxygen present in the gas represents an excess of approximately 15% to 100% relative to stoichiometry.

The process according to the invention is carried out at temperatures exceeding 250° C. and preferably at temperatures ranging from 300° to 550° C.

The contact time between the gas flow and the catalyst according to the invention is determined such that the desired conversion rate is attained.

According to the process of the invention, the contact time is short and preferably ranges from 0.5 to 2.5 seconds, (i.e., no greater than about 2.5 seconds) which corresponds to a high space velocity. This VVH, which represents the treated gas volume per catalyst volume and per hour preferably exceeds 1,500 h$^{-1}$ and even more preferably ranges from 2,000 to 10,000 h$^{-1}$.

The gaseous effluent containing the sulfur compounds and the gas containing the free oxygen can be separately contacted with the catalyst. However, with a view to providing a very homogeneous gaseous reaction medium, it is preferable to first mix said effluent with the gas containing the free oxygen and then contact the thus formed mixture with the catalyst according to the invention.

The mixture obtained and which is referred to hereinafter as the "gaseous flow" has a widely varying composition and, in a preferred embodiment of the invention, the proportions of the different constituents are as follows:

| | |
|---|---|
| (i) Hydrogen sulfide = | 0.05% to 0.2% |
| (ii) Oxygen = | 0.03% to 0.2% |
| (iii) Water = | 3% to 30% |
| (iv) Nitrogen = | quantity sufficient for 100%. |

In a preferred embodiment of the process of the invention, a gaseous effluent having a potential $H_2S$ content below 1% (free $H_2S + H_2S$ from $CS_2$ and COS) is contacted with an oxygen-containing gas. The $O_2/H_2S$ molar ratio advantageously ranges from 2.0 to 10.0 and preferably from 2.3 to 4.0 with a monolithic catalyst. Preferably, a monolithic titanium dioxide catalyst is used.

The process of the invention makes it possible to obtain a flow containing very little $SO_3$ and preferably less than 50 ppm.

Thus, the monolithic catalyst permits a better selectivity with respect to the reaction of oxidizing hydrogen sulfide into $SO_2$ compared to the oxidation reaction giving rise to the formation of $SO_3$.

In order to further illustrate the present invention and the advantages thereof, the following specific examples are given (one comparative and one according to the invention), it being understood that same are intended only as illustrative and in nowise limitative.

COMPARATIVE EXAMPLE 1

A lime suspension for neutralizing all of the sulfates was added to a suspension of titanium dioxide obtained after hydrolysis and filtration in the conventional sulfuric acidulation of ilmenite. The suspension was dried at 150° C. for 1 hour. The powder obtained was mixed in the presence of water and nitric acid in the following proportions:

(i) $TiO_2$ powder : 58%
(ii) $HNO_3$ : 2%
(iii) $H_2O$ : 40%

The thus obtained paste was extruded through a cylindrical spinneret having a diameter of 4 μm to produce cylindrical extrudates. The latter were dried for 15 hours at 120° C. and then calcined for 2 hours at 450° C.

The extrudates were impregnated with a solution containing 28.94 g of iron nitrate and 0.66 g of hexachloroplatinic acid, at a rate of 35 cc of solution per 100 g of extrudates.

After impregnation, the extrudates were subjected to a drying operation for 15 hours at 120° C. and a calcining operation for 2 hours at 450° C.

This provided extrudates containing 4% by weight iron and 0.25% by weight platinum.

The extrudates obtained had the following characteristics:

(a) Extrudate diameter 3.5 mm
(b) Specific surface area 120 m$^2$/g
(c) Total pore volume 0.35 cm$^3$/g

EXAMPLE 2

The paste produced in Example 1 was extruded through a spinneret having a square section and a side length of 20 mm and having 169 small squares with a side length of 1.4 mm. The monoliths were then dried at 120° C. for 15 hours and then calcined for 2 hours at 450° C.

The monoliths were then impregnated as in Example 1 with a solution containing 28.94 g of iron nitrate and 0.66 g of hexachloroplatinic acid, at a rate of 35 cc of solution for 100 g of monoliths.

After drying and calcining as in Example 1, a catalyst having the following characteristics was obtained:
(a) Monoliths with square section of side length 20 mm
(b) Specific surface area : 110 m$^2$/g
(c) Total pore volume : 0.30 cm$^3$/g Catalytic Tests These catalytic tests were to compare the activities of the catalysts of Examples 1 and 2 when oxidizing hydrogen sulfide into $SO_2$ and $SO_3$.

Into a reactor was introduced a gas having the following composition by volume:
$SO_2$ : 400 ppm
$H_2S$ : 800 ppm
$O_2$ : 2%
$H_2O$ : 30%
$N_2$ : balance In isothermal operation, at a temperature of 350° C. and for an identical volume of catalyst-filled reactors, the volume velocity of the gases was 1,800 h$^{-1}$, calculated under conditions of normal temperature and pressure. The gas contact time was 2 seconds. The outlet gases were analyzed for $H_2S$ and $SO_2$ by gas chromatography.

Analysis of the $SO_3$ was carried out by trapping on glass wool and chemical determination of the sulfuric solution obtained by washing the wool.

The activity of the catalysts was compared by measuring the hydrogen sulfide transformation rate and the percentage of $SO_3$ formed was determined.

The results obtained are reported in the following Table:

TABLE

| | | Final Concentrations | | |
|---|---|---|---|---|
| | Catalyst Type | $H_2S$ | $SO_2$ | $SO_3$ |
| Comparative Example 1 | $TiO_2$ extrudates | 0 | 750 ppm | 450 ppm |
| Example 2 | $TiO_2$ monoliths | 0 | 1,170 ppm | 30 ppm |

Examination of the results reported in the Table evidences the superiority of the catalyst according to the invention compared with the prior art catalyst with respect to its $SO_2$ selectivity.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A catalyst shaped article in mass form adapted for the catalytic oxidation conversion of compounds of sulfur into sulfur dioxide, the catalyst consisting essentially of titanium dioxide and a layer of at least one precious metal, the titanium dioxide being extruded in monolithic form and having a pore volume of 50% to 70%.

2. The catalyst shaped article as defined by claim 1, said catalyst shaped article comprising an alveolar or honeycomb structrue adopted for conveying a gaseous flowstream through the channels or ducts thereof.

3. The catalyst shaped article as defined by claim 1, said titanium dioxide comprising from 0.5% to 100% by weight of said catalyst shaped article.

4. The catalyst shaped article as defined by claim 3, said titanium dioxide comprising from 60% to 99% of said catalyst shaped article.

5. The catalyst shaped article as defined by claim 1, further comprising an alkaline earth metal sulfate or an ammonium sulfate.

6. The catalyst shaped article as defined by claim 1, further comprising a layer of a catalytically active element comprising at least one on-precious metal of Group VIII of the Periodic Table.

7. The catalyst shaped article as defined by claim 1, in calcined state.

8. A catalyst shaped article for converting a gas containing sulfur compounds into a purified gas containing sulfur dioxide and less than 50 ppm sulfur trioxide when the catalyst shaped article is contacted with the as for no greater than about 2.5 seconds, the catalyst shaped article consisting essentially of titanium dioxide in monolithic form, the titanium dioxide having a pore volume of 50% to 70% and being coated with a layer of at least one precious metal.

9. The catalyst shaped article as defined by claim 8, said catalyst shaped article including orifices completely extending therethrough.

10. The catalyst shaped article as defined by claim 8, said titanium dioxide comprising from 0.5% to 100% by weight of the catalyst shaped article.

11. The catalyst shaped article as defined by claim 10, said titanium dioxide comprising from 60% to 99% of the catalyst shaped article.

12. The catalyst shaped article as defined by claim 8, further comprising an alkaline earth metal sulfate or an ammonium sulfate.

13. The catalyst shaped article as defined by claim 8, further comprising a layer of a catalytically active element comprising at least one non-precious metal of Group VIII of the Periodic Table.

14. The catalyst shaped article as defined by claim 8, in calcined state.

15. The catalyst shaped article as defined by claim 8, further comprising iron oxide.

* * * * *